United States Patent [19]

Lee

[11] 3,767,416

[45] Oct. 23, 1973

[54] PAUNCH MANURE TREATMENT PROCESS
[76] Inventor: Kyu-Yawp Lee, 766 Leakwood Dr., Omaha, Nebr. 68154
[22] Filed: July 10, 1972
[21] Appl. No.: 269,949

[52] U.S. Cl.............................. 99/2 R, 99/7, 99/14, 260/112 R
[51] Int. Cl............................ A23k 1/00, A23j 3/00
[58] Field of Search ......................... 99/2, 7, 14, 18; 71/11, 15, 23; 260/112

[56] References Cited
UNITED STATES PATENTS
1,071,218  8/1913  Dyck.......................................... 99/7
3,545,977  12/1970  Stahler...................................... 99/7

OTHER PUBLICATIONS

Gonashvili; Chemical Abstracts, Vol. 52, 4717c, 1958.

Primary Examiner—Norman Yudkoff
Assistant Examiner—Curtis P. Ribando

[57] ABSTRACT

The conversion of Paunch Manure into a valuable and useful product and the reduction of highly undesirable odors therefrom by treating it with a mixture of tricholroacetic acid, hydrochloric acid, sodium lauryl sulfate and heat.

4 Claims, No Drawings

PAUNCH MANURE TREATMENT PROCESS

SUMMARY

This invention relates to the treatment of paunch manure and relates more particularly to a technique for processing paunch manure in order to extract proteins as precipitates, produce silage from the residue therefrom, and to reduce undesirable odors from paunch manure.

Ruminants, for example, oxen, sheep, deer, antelopes, have four distinct stomach compartments: the first stomach is called paunch or rumen, the second stomach is called honeycomb or reticulum, the third stomach is called manyplies or omasum, and the fourth is the true stomach or abomasum.

When a ruminant takes food such as silage, hay, etc., into its system, the food is chewed and moistened in the mouth and swallowed into the first stomach for thorough mixing and temporary storage until the food is pushed up back to the mouth for thorough chewing in the cud. This predigested food then proceeds to the second stomach onto the third and finally the fourth stomach. According to available literature, no digestive enzymes are secreted in the first, second, or third stomach. The softening and partial digestion in these stomachs are accomplished by hydrolysis and bacterial action on ingested plant cell walls, from which proteins and other nutrients are released into the stomach mixture but not yet absorbed by the animal. In other words, when cattle are slaughtered, practically all the original food intake and proteins from the bacteria are well digested and converted into organic acids such as butryic acid and sugars but not absorbed and used up. Currently this valuable food is sent to packing house waste treatment plants and thus not only is it wasted but also it pollutes the air and streams.

According to statistics cited by the United States Department of Agriculture, 31,419,000 head of cattle and 10,256,000 sheep were slaughtered in 1971. Since the average weight of a cattle's stomach content is about fifty pounds, the total slaughter waste discharge in 1971 in the United States was in excess of one million tons. In addition, the constant strong offensive odors from such wastes in meat packing centers such as Omaha, Nebraska; Minneapolis-St. Paul, Minnesota; St. Louis, Missouri; or Chicago, Illinois are a major source of air and water pollution.

At the present time, when cattle are slaughtered at meat packing plants, the stomach contents are flushed into separate sewer pipes and transported to packing house waste treatment plants at great expense. From the treatment plants, the fat and manure are separated and transported to landfill sites for burial, or in some cases are released into streams. During this process, highly undesirable odors are produced which are objected to by residents in the surrounding community and the disposal of huge quantities of solid residue after the treatment can cause formation of harmful nitrites and/or nitrates in the soil.

To date no practical method has been devised that will eliminate the offensive odors and also be a satisfactory means for the disposal of the residue. Some attempts have been made at utilizing paunch manure for fertilizer, mixing it with feed or biodegrading and recycling it. However, the strong offensive odors and the continuous supply of paunch manure in great quantity regardless of weather, day of week or month in relation to a zero demand by farmers for such product or slowness in biodegrading the wastes make it impractical processes for disposing of these wastes. The possibility of starving cattle before slaughter is impractical due to the mortality rate, loss in weight in transit and the holding period in stockyards. The relocation of slaughter houses to remote geographical locations is another possibility but additional relocation expense, shortage of skilled labor, power and water supply in such locations in addition to requirements for cooling and transporting the dressed carcasses back to population centers make it economically unfeasible.

Under these circumstances, there are certain other criteria other than functional effectiveness which must be satisfied if the techniques and procedures of the type with which the instant invention is concerned are to be operational in practice. The concept must be simple and practical enough so that the actual operation is continuously effective without added construction costs and day-to-day operational expense. For example, in Omaha, Nebraska, about one hundred fifty tons of solid slaughter house wastes and many times this amount in liquid form are produced and disposed of six days a week, every week of the year. Thus, if the treatment process is too slow (as in biodegrading) in relation to the output of waste, or if there is a mechanical failure in the process plant, the large areas of land and construction costs needed to contain the wastes and its odors would be prohibitive.

Considering the above background, it is the primary object of this invention to:

1. Adapt techniques and procedures to reduce paunch manure odors from existing packing plant design and operation;
2. Transport paunch manure to a remote location in a sealed container for processing;
3. Extract proteins and othr nutrients from paunch manure that can then be fed back to livestock;
4. Process the residue to enable it to be fed back to livestock as roughage; and
5. Recycle the solvent used for extraction of protein and other nutrients.

Other and further objects of this invention reside in the specific chemical constituents and combinations of the same in the compositions hereinafter set forth as well as the particular manipulative steps of the various procedures used. Although the chemicals and procedures set forth hereinafter is preferred, various modifications can be made thereto without departing from the instant inventive concepts. Further it is also possible to substitute chemically similar material and composition for the ingredients used in this instant invention. Additionally, one or more processing step (or steps) can be added to or eliminated from the inventive concepts according to the need in actual operational situations. (e.g., silage can be produced without extracting proteins or one or more feed supplements may be added to the silage or protein concentrates).

DESCRIPTION OF THE INVENTION

This invention relates to a processing technique for the conversion of paunch manure into useful products. For the purpose of clarity, the conversion process is described in chronological steps.

Step 1

An aqueous solution is prepared, comprised of an acid, a flucculent, and a precipitating agent. The particular compounds and concentrations thereof selected to comprise the solution will change the efficiency of the process. A solution comprised of 0.5 percent to 3 percent of trichloroacetic acid; and 0.5 percent to 1 percent of sodium lauryl sulfate; and having approximately 1 percent of one (1) normality of hydrochloric acid, is an effective and efficient solution. In the preferred solution, the trichloroacetic acid acts as the precipitating agent, the hydrochloric acid acts as the acid, and the sodium lauryl sulfate acts as the flocculent.

Step 2

The paunch manure is mixed with the aqueous solution in a ratio of one part paunch mixture to one to two parts by volume of the aqueous solution. The mixing of paunch manure and the aqueous solution causes a chemical and physical reaction in which protein and other nutrients are caused to be partially precipitated and the majority of the existing bacteria are killed. Due to the acid and anoerobic condition, the mixing is preferably maintained within a closed container. An anaerobic condition is prefereably maintained within the container to suppress the formation of aerobic bacteria which cannot survive in the absence of oxygen. The suppression of aerobic bacteria substantially eliminates the offensive odors of the paunch manure. The efficiency of the process may be increased by agitating the mixture during this step.

Step 3

The roughage portion of the paunch manure is readily extracted from the mixture by passing the mixture through a filtering screen. Once the roughage is removed from the mixture, it is edible by livestock and is similar in composition to silage. Preferably the roughage is stored under anaerobic conditions until it is consumed by livestock thus preventing the formation of aerobic bacteria and the resulting offensive odors.

Step 4

The container is unsealed and the mixture is preferably heated until boiling occurs thus further assisting the precipitation of the proteins and other nutrients. During this step, the trichloroacetic acid acts as a precipitating agent causing proteins to be precipitated from the mixture while the sodium lauryl sulfate acts as a flocculent causing the precipitate to rise to the fluid surface of the mixture for efficient removal thereof. The hydrochloric acid effectively kills the majority of the bacteria in the mixture. Although heating to boiling is not necessary, such boiling increases the yield of protein from the process, reduces the time required for the precipitation to occur, and generates the bubbles necessary for flocculation. Alternatively, no heat need be applied, but this reduces the yield of protein, increases the time required for precipitation, and requires a source of bubbles for flocculation. The concentrated protein flocculate is readily removed from the fluid surface by skimming.

Step 5

The flocculent, skimmed from the surface of the mixture in Step 4 is comprised of a small amount of the aqueous solution and a concentrated protein precipitate. The flocculate may be immediately added in the moist state to dry feed ingredients to increase the protein content thereof, or alternatively it may be dried by the application of heat and air for storage and later use.

Step 6

The aqueous solution remaining in the container has been slightly diluted by the Steps 2 through 5, but still contains valuable chemicals. By adding small amounts of trichloroacetic acid, hydrochloric acid, and sodium lauryl sulfate the concentrations of these chemicals may be increased sufficiently to recycle the aqueous solution back into the process at Step 2. Because the aqueous solution may be recycled with the addition of only nominal amounts of chemicals, the process is efficient.

Alternatively, the sodium lauryl sulfate may be omitted from the aqueous solution and instead of skimming the flocculate as in Step 4, the mixture may be centrifuged thus concentrating the protein for efficient removal. Leaving aqueous solution for recycling as described in Step 6.

Analysis of the extracted proteins and silage has been performed by an independent laboratory using the Kjeldahl method. The results of this analysis showed 34.8 percent crude protein by weight in the dried flocculate of this process and 7.2 percent crude protein by weight in the silage produced in Step 3 of this process. In limited animal feeding trials the silage produced in Step 3 was accepted by several farm animals.

In summary, this invention solves odor and water pollution problems caused by paunch manure, and converts what was formerly an almost useless and nuisance paunch manure into highly valuable and marketable products with little added costs or alteration of slaughter house operations.

I claim:

1. A method of processing paunch manure, the process comprising the following steps:
    a. Preparing an aqueous solution comprising a precipitating agent, an acid, and a flocculent, said precipitating agent is 0.5 percent to 3 percent trichloroacetic acid, said acid is 1 percent of one normal hydrochloric acid (1N HCl), and said flocculent is 0.5 percent to 1 percent sodium lauryl sulfate;
    b. Adding paunch manure to said aqueous solution in a volumetric ratio of approximately one part of said paunch manure to one to two parts of said aqueous solution, thus forming a mixture wherein at least some of the proteins and nutrients of said mixture are precipitated, and the majority of the bacteria are killed, and forming a residue edible by livestock; and
    c. Passing said mixture through a filter to remove said residue from said precipitate and said aqueous solution.

2. The process of claim 1 wherein said precipitate and said aqueous solution is heated to boiling after having passed through said filter causing an increased rate of precipitation of said proteins and other nutrients, thereby causing said precipitate to flocculate, said precipitate then being separated from said aqueous solution.

3. The process of claim 1 wherein gasseous matter is injected into the filtrate below the fluid surface thereof, thereby causing said precipitate to flocculate, said precipitate then being separated from said aqueous solution.

4. The process of claim 1 wherein said filtrate is centrifuged, thereby concentrating said precipitate, said precipitate then being separated from said aqueous solution.

* * * * *